(12) United States Patent
Steele et al.

(10) Patent No.: US 12,270,381 B2
(45) Date of Patent: Apr. 8, 2025

(54) NETWORK FOR MULTI-ROTOR WIND TURBINE ARRANGEMENT

(71) Applicant: VESTAS WIND SYSTEMS A/S, Aarhus N. (DK)

(72) Inventors: David Steele, Skanderborg (DK); Jens Steen Krogh, Hjortshøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 383 days.

(21) Appl. No.: 17/791,133

(22) PCT Filed: Jan. 5, 2021

(86) PCT No.: PCT/DK2021/050001
§ 371 (c)(1),
(2) Date: Jul. 6, 2022

(87) PCT Pub. No.: WO2021/139861
PCT Pub. Date: Jul. 15, 2021

(65) Prior Publication Data
US 2023/0048480 A1    Feb. 16, 2023

(30) Foreign Application Priority Data
Jan. 6, 2020   (DK) ............................ PA 2020 70002

(51) Int. Cl.
*F03D 7/04*    (2006.01)
*F03D 1/02*    (2006.01)
*F03D 7/02*    (2006.01)

(52) U.S. Cl.
CPC .............. *F03D 7/047* (2013.01); *F03D 1/02* (2013.01); *F03D 7/02* (2013.01); *G05B 2219/2619* (2013.01)

(58) Field of Classification Search
CPC ........................................................ F03D 7/047
See application file for complete search history.

(56) References Cited

U.S. PATENT DOCUMENTS

2010/0268849 A1* 10/2010 Bengtson ........... G05B 23/0237
709/248
2010/0305767 A1   12/2010 Bengtson
(Continued)

FOREIGN PATENT DOCUMENTS

EP   2921699 A1   9/2015
WO   2021139861 A1   7/2021

OTHER PUBLICATIONS

Danish Patent and Trademark Office, 1st Technical Examination including the Search Report and the Search Opinion for Application PA 2020 70002 dated Jul. 1, 2020.
(Continued)

*Primary Examiner* — Suresh Suryawanshi
(74) *Attorney, Agent, or Firm* — Patterson + Sheridan, LLP

(57) ABSTRACT

A control network for a wind turbine system, the wind turbine system comprising multiple rotor-nacelle assemblies mounted on a support structure, the control network comprising: a respective local network associated with each rotor-nacelle assembly, each local network comprising multiple nodes; a central network that is connected to each local network, the central network comprising multiple nodes; and a synchronization device that synchronizes data transmission throughout the control network.

14 Claims, 3 Drawing Sheets

(56) References Cited

U.S. PATENT DOCUMENTS

| | | | |
|---|---|---|---|
| 2012/0191249 A1* | 7/2012 | Zapata | G05B 15/02 |
| | | | 700/275 |
| 2012/0261917 A1* | 10/2012 | Egedal | F03D 9/257 |
| | | | 290/44 |
| 2015/0167640 A1 | 6/2015 | Bowyer et al. | |
| 2018/0180022 A1* | 6/2018 | Baun | F03D 7/0268 |
| 2018/0283355 A1 | 10/2018 | Miranda | |
| 2018/0347544 A1 | 12/2018 | Grunnet et al. | |
| 2018/0355847 A1 | 12/2018 | Baun et al. | |

OTHER PUBLICATIONS

PCT, International Search Report for Application PCT/DK2021/050001 dated Aug. 4, 2021.

PCT, Written Opinion of the International Searching Authority for Application PCT/DK2021/050001 dated Aug. 4, 2021.

* cited by examiner

NETWORK FOR MULTI-ROTOR WIND TURBINE ARRANGEMENT

TECHNICAL FIELD

The invention relates to a control network and an associated method for controlling a multi-rotor wind turbine system.

BACKGROUND TO THE INVENTION

Multi-rotor wind turbine arrangements have been proposed, in which multiple rotor-nacelle assemblies (RNAs) are supported on a common support tower. Such a configuration achieves similar economies of scale that can be obtained with a very large single rotor turbine, but avoids the associated drawbacks such as high blade mass and scaled-up power electronic components. However, one of the challenges to implementing such arrangements is to create a suitable control system that can handle the increased complexity of the arrangement relative to a conventional single rotor turbine.

In order to comply with relevant IEC standards, a control system for a multi-rotor arrangement must treat the overall arrangement as a single machine and so unify control of the individual RNAs, so that the control system as a whole emulates the safety functionality of a conventional wind turbine generator. At the same time, it is desirable to retain the existing functionality of control systems for individual RNAs as far as possible to avoid a complete redesign of the control architecture.

An individual RNA generally has numerous distributed electronic control units (ECUs), each of which has a dedicated function and is positioned according to the need to interface with sensors and actuators and to provide control, data acquisition and/or communication switching functions. Coordinating operation of the ECUs of a single RNA therefore entails establishing a network to allow communication between the ECUs, and managing that network to maintain system integrity.

It follows that control of a system comprising multiple RNAs in a unified manner, whilst retaining the existing functionality of known control networks, entails establishing a network connecting each of the respective control networks of the RNAs. There are various ways to configure such a network, but network engineering principles imply that however the network is arranged it will have a complexity that is an order of magnitude greater than that of a control system for an individual RNA.

A particular challenge for a control system for a multi-rotor arrangement is to scale the safety functionality provided in conventional control arrangements. This is because it is imperative to protect the integrity of data relating to safety constraints, which becomes ever more challenging as the system becomes more complex. Safety-related functions must also take precedence over normal operation of the system, and so the control system must have the ability to implement an immediate override of any aspect of the operation of the multi-rotor arrangement, and without inadvertently causing other problems in doing so.

Safety-related control functions can include functions associated with protecting personnel working on the system, such as emergency stops, interlocks and light curtains, as well as functions that protect the system such as load monitoring, over-speed detection, arc detection, smoke detection, yaw position monitoring, switchgear control and blade pitch control. Data relevant to any of these functions is categorised as safety-critical data and therefore must be processed with high integrity.

The safety functions themselves become more complex in a multi-rotor system, for example because actions are not necessarily applied globally to every RNA. Some faults are local in nature, and total shutdown of a multi-rotor arrangement should be avoided if not essential. Also, determining the status of a given RNA may entail retrieving data relating to a different RNA and/or to the support tower.

These constraints imply a deterministic control system, meaning that the behaviour of the system is entirely predictable for any possible set of inputs and operating states. The challenge of maintaining deterministic behaviour in a multi-rotor arrangement increases with each RNA that is added. Although safety-related deterministic networks are known for individual RNAs, such networks are not designed to communicate with other networks without compromising safety performance.

One aspect of the predictability required of safety-related networks is that the worst-case time for data to be transmitted and processed must be known precisely, because safety functions must execute within a specific interval after a hazard arises to remove the risk before it causes damage. In known safety-related networks for conventional wind turbine generators, maintaining such time constraints generally entails designating one node as a master for clock synchronisation between all safety nodes connected to the network.

However, this synchronisation and the associated knowledge of the worst-case time for data transmission would be lost, thereby compromising safety functions, if such a network were connected to another network.

Alongside safety considerations, another objective in a multi-rotor system is to ensure that the control system continues to function when parts of the system are physically absent, for example during maintenance or commissioning. For example, before all RNAs have been added during commissioning, it may be desirable for those RNAs that have been installed to provide certain functions, including pitching out of the wind to avoid damage to the RNA, servicing functions and safety functions to protect personnel working on the system.

Similarly, there may also be a need for an RNA to operate autonomously to some extent within the context of the overall arrangement. For example, in some applications it may be desirable for an RNA to continue performing local functions when it loses its connection to other parts of the arrangement.

It is against this background that the invention has been devised.

SUMMARY OF THE INVENTION

An aspect of the invention provides a control network for a wind turbine system. The wind turbine system comprises multiple rotor-nacelle assemblies mounted on a support structure. The control network comprises a respective local network associated with each rotor-nacelle assembly, each local network comprising multiple nodes, and a central network that is connected to each local network, the central network comprising multiple nodes. The control network further includes a synchronisation device that synchronises data transmission throughout the control network.

Providing a synchronisation device to synchronise data transmission throughout the network enables the control network to be deterministic, so that it is configured to provide the critical timing information that is necessary for safety-related functions, Meanwhile, the two-level nature of the control network, insofar as it includes a central network and a set of local networks, provides for a hierarchical architecture that allows actions to be coordinated around the control network, which further supports safety-related functionality.

The synchronisation device may comprise a node of the central network or of one of the local networks that is configured as a master node. Multiple nodes of the central network may act collectively as the synchronisation devices, with one of those nodes being designated as the master node.

A node of the central network is optionally a network switch. In such embodiments, the network switch of the central network may at least partially define the synchronisation device. For example, the network switch of the central network may be the master node.

In some embodiments, at least one node of the central network is a safety controller, A node of each local network may be a network switch, in which case the network switch of the central network may be connected to the network switch of each local network. Each network switch of each local network may be configured to act as a master node for synchronising data transmission within its associated local network in the event that a connection to the synchronisation device is disrupted. This beneficially allows for continued operation of the rotor-nacelle assemblies in the event that they become disconnected from the central network.

A node of each local network is optionally safety controller.

The control network may be configured as a safety network.

The control network may be configured for packet-switched communication.

The synchronisation device may be configured to schedule data transmissions throughout the control network according to a network clock.

The control network may be configured to route all data transmission between rotor-nacelle assemblies through the central network.

The central network may be associated with the support structure.

The invention also extends to a wind turbine system comprising the control network of the above aspect.

Another aspect of the invention provides a method of controlling a wind turbine system. The wind turbine system comprises multiple rotor-nacelle assemblies mounted on a support structure. The method comprises: connecting respective groups of nodes associated with each rotor-nacelle assembly to establish a respective local network for each rotor-nacelle assembly; connecting each local network to a central network, the central network having multiple nodes; and synchronising data transfer throughout the control network, It will be appreciated that preferred and/or optional features of each aspect of the invention may be incorporated alone or in appropriate combination in the other aspects of the invention also.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

In general terms, the invention relates to methods and control systems for operating a multi-rotor arrangement, in particular to provide safety-related functions but also to support operational flexibility.

To meet this need, embodiments of the invention provide a control network having a safety and communications architecture divided into two layers. A first layer operates at the level of individual RNAs to handle safety-related traffic routed internally within each RNA, the first layer therefore being composed of a set of local networks, each associated with a respective RNA. The second layer is defined by a central network that connects to each of the local networks to provide centralised control of each RNA that is physically present and operational.

The central network may be associated with—and most or all of its control devices may be physically located in—a support tower of the arrangement, for example. In this case, the central network handles both data internal to the tower, including communications between local safety controllers and other network devices physically located in the tower, as well as signals exchanged between the central tower and safety controllers of the local networks operating at the first level of the control network. The central network may also allow for direct interfacing between the respective safety controllers of different RNAs.

To provide the precise timing information required for safety-related functions, a group of nodes within the control network are used to synchronise all communications within the control network, one of the nodes of the group being designated as a master node that organises and determines synchronisation between the nodes of the group. Conveniently, although not necessarily, a network switch within the central network may be designated as the master node, while respective network switches of the local networks operate as slave clocks that are synchronised to the master. This allows global synchronisation of data transmission across the control network, ensuring that safety-related functions can execute within the required time wherever risks might arise in the system. In this way, the master node may be considered to act as a synchronisation device that synchronises the entire network, either on its own or in combination with the other synchronising nodes. This in turn enables the control network to be deterministic.

To provide context for the invention, an illustrative multi-rotor wind turbine system that is suitable for use with embodiments of the invention is now described with reference to FIGS. 1 to 3. It should be appreciated that the system of FIGS. 1 to 3 is referred to here by way of example only, and it would be possible to implement embodiments of the invention into many different types of wind turbine systems.

Figure 1:
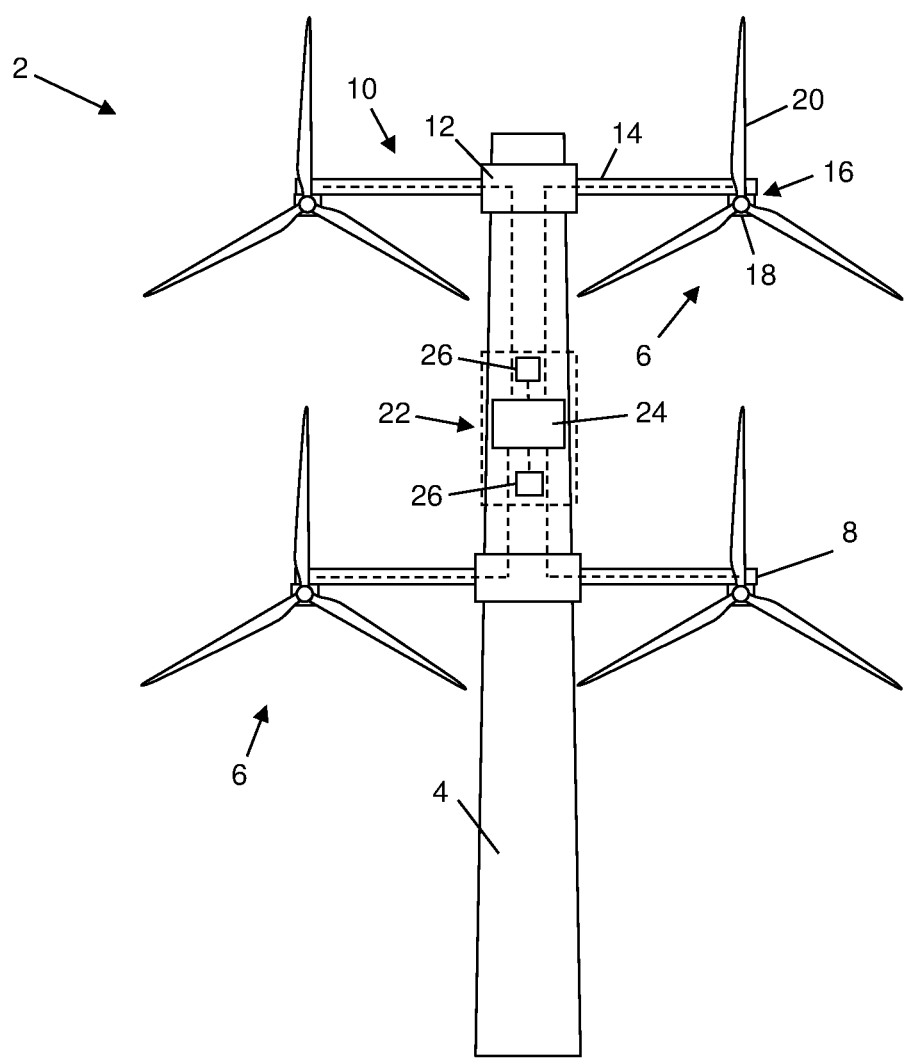
FIG. 1 is a schematic diagram of a multi-rotor wind turbine arrangement that is suitable for use with embodiments of the invention.
Figure 2:
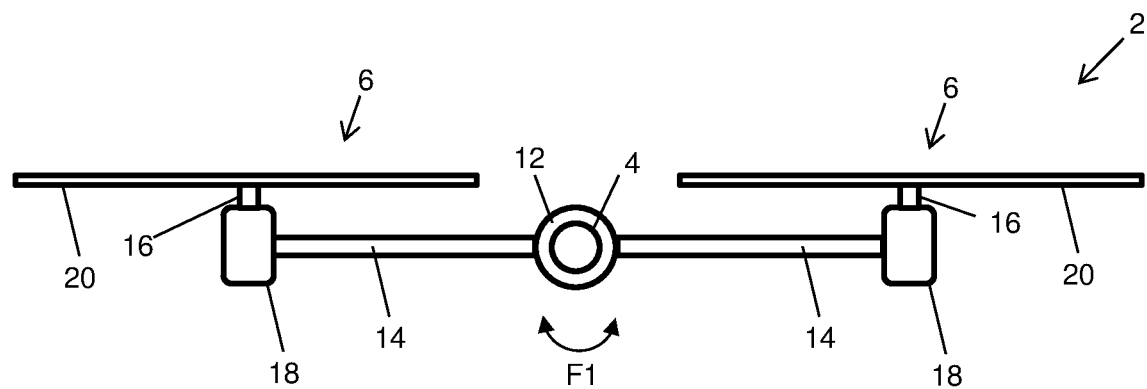
FIG. 2 corresponds to FIG. 1 but shows the arrangement from above.
Figure 3:
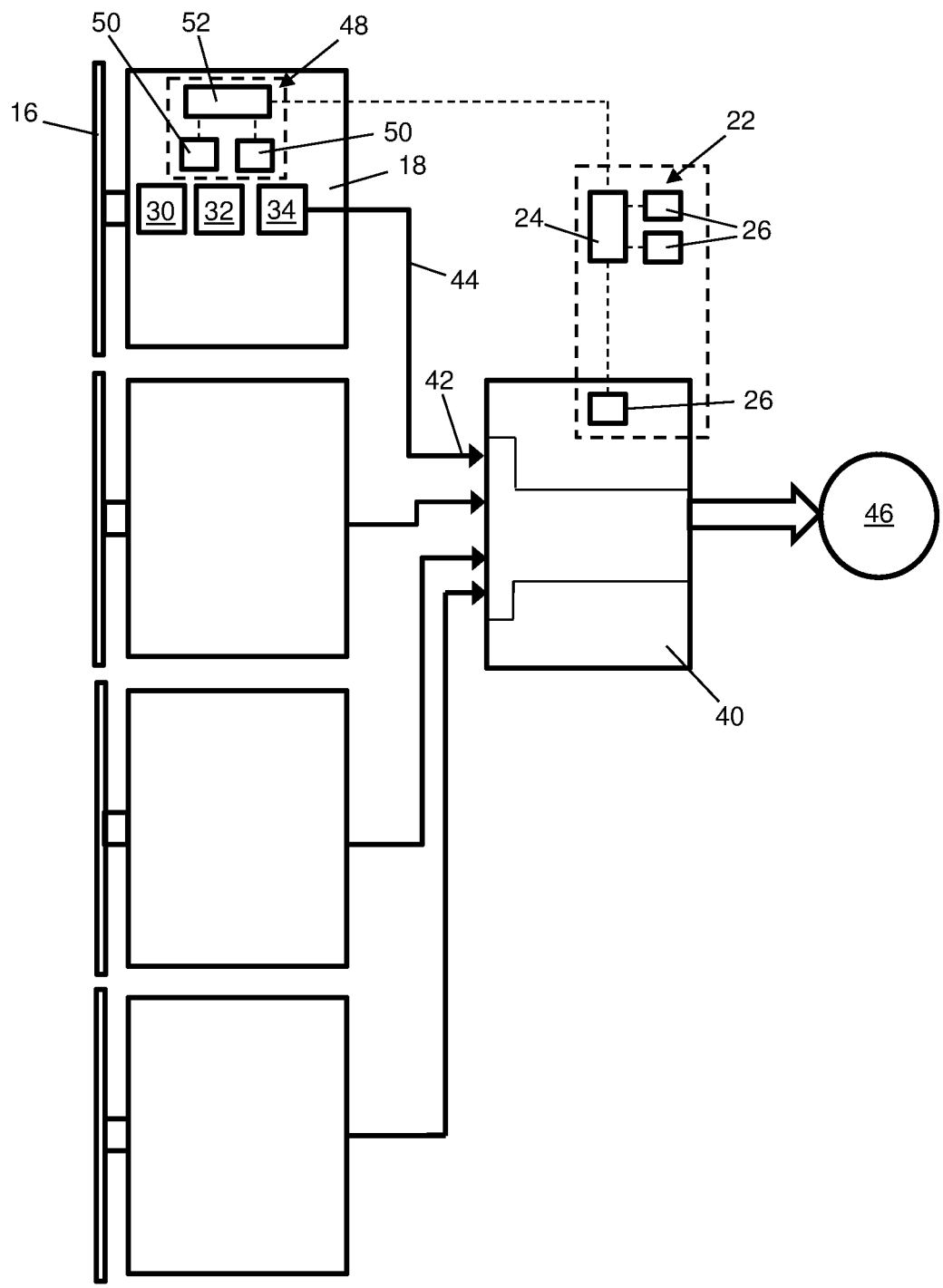
FIG. 3 shows schematically the architecture of system-level components of the arrangement of FIG. 1.

Referring firstly to FIGS. 1 and 2, a wind turbine system 2 includes a support structure 4 on which is mounted a plurality of wind turbines, or rotor-nacelle assemblies (RNAs) 6. In this embodiment, the support structure 4 is a slender tower that is mounted on a foundation embedded in the ground, as is typical with modern wind turbine systems, although it should be appreciated that other support structures are possible, for example frame-like structures.

Note that the term 'RNA' is used here in the industry-accepted sense to refer mainly to the generating components of the wind turbine system and as being separate to the support structure 4.

In this embodiment, there are four RNAs 6, and these are mounted to the support structure 4 in two pairs, each pair including two RNAs 6 that are mounted to the support structure 4 by a respective support arm arrangement 10.

It is noted that in other embodiments the wind turbine system may also include one or more nacelle assemblies mounted directly onto the main support structure 4, for example at the top of the tower. For the purposes of this application the term 'rotor-nacelle assembly' should be considered to include such nacelle assemblies, although it is recognised that in practice a different name may be applied to nacelle assemblies that are mounted directly to the support structure, to distinguish them from RNAs that are supported by arms. The control arrangements described below for the RNAs of the wind turbine system apply equally to nacelle assemblies that are mounted directly to a support structure, which would be controlled in the same way. In particular, a nacelle assembly mounted directly to the support structure would be provided with a local network in the same way as the RNAs.

Each support arm arrangement 10 comprises a mount portion 12 and first and second arms 14 that extend from the mount portion and carry a respective RNA 6. As such, each of the support arms 14 includes a proximal end connected to the mount portion 12 and a distal end that is connected to an RNA 6.

The support arm arrangement 10 is mounted to the support structure 4 at the mount portion 12 so that the support arm arrangement 10 is able to yaw about the vertical axis of the support structure 4. Suitable yaw gearing (not shown) is provided for this purpose. This movement provides a first degree of freedom for the RNA 6 with respect to the support structure, as shown on FIG. 2 as 'F1'.

Each RNA 6 includes a rotor 16 that is rotatably mounted to a nacelle 18 in the usual way. The rotor 16 has a set of three blades 20 in this embodiment. Three-bladed rotors are a common rotor configuration, but different numbers of blades are also known; two-bladed configurations are also quite common, for example. Thus, the RNAs 6 are able to generate power from the flow of wind that passes through the swept area or 'rotor disc' associated with the rotation of the blades.

FIG. 1 also shows components of a central network 22 residing within the support structure 4, those components including a node defining a central network switch 24 and two further nodes designated as central nodes 26. The central nodes 26 are illustrative of ECUs and other network devices associated with the central network 22. The central network 22 forms a second level of a unified control network for the wind turbine system 2, as noted above. The control network is described in more detail later with reference to FIG. 4.

FIG. 1 also indicates, in dashed lines, communication pathways between the central network switch 24 and the central nodes 26, indicating that communication within the central network 22 between the central nodes 26 occurs via the central network switch 24 in a conventional manner. Further communication pathways extend between the central network switch 24 and each RNA 6, thus connecting each RNA 6 to the central network 22 to form the unified control network, as shall become clear in the description that follows.

The relationship between the physical components of the control network and the system components of the wind turbine system 2 is illustrated in FIG. 3. FIG. 3 shows all four RNAs 6 of the wind turbine system 2, with selected internal features of the nacelle 18 of one of the RNAs 6 being made visible. Each of the RNAs 6 shown in FIG. 3 can be considered to be substantially identical.

On a system level, each RNA 6 includes a gearbox 30 that is driven by the rotor 16, and a power generation system including a generator 32 and a converter system 34. The generator 32 is connected to the gearbox 30 to generate power from torque in the gearbox 30. The generated power is transferred to the converter system 34, which converts the power into a suitable frequency and voltage for onward transmission, The precise configuration of the generator 32 and converter system 34 are not central to the invention and will not be described in detail, However, for present purposes they can be considered to be conventional and, in one embodiment, may be based on a full scale converter (FSC) architecture or a doubly fed induction generator (DFIG) architecture.

In the illustrated embodiment, the power output of the converter 34 of each RNA 6 is fed to a distribution unit 40, which has a function to receive power inputs 42 from the RNAs 6 over suitable cabling 44 for onward transmission to a load 46 such as an electrical grid.

The skilled person will appreciate that there are various alternative power transmission systems that could be implemented to take power from several generators to a single grid, and so this embodiment is described for illustrative purposes only, It should be noted at this point that only a single wind turbine system 2 is described here, but that several such systems may be grouped together to form a wind power plant, also referred to as a wind farm or 'park'. In this case, a power plant control and distribution facility (not shown) would be provided to coordinate and distribute the power outputs from the individual wind turbine systems to the wider grid.

Since the wind turbine system 2 includes a plurality of RNAs 6, each of which is operable to generate electrical power as its respective rotor 16 is driven by wind, the system 2 includes localised control means in the form of a respective local network 48 associated with each RNA 6.

Each local network 48 is housed within the nacelle 18 of its associated RNA 6, and includes a plurality of nodes in the form of local control modules 50 embodied as ECUs or other computing devices, each of which performs a specific function. FIG. 3 shows two local control modules 50 in the local network 48 for illustrative purposes, although in practice each local network 48 would have several more nodes. The local network 48 includes a further node defining a local network switch 52 that provides for communication between the other nodes of the local network 48.

As the dashed lines in FIG. 3 indicate, the local network switch 52 can also communicate with the central network switch 24, thereby establishing communication between the central network 22 and the local network 48.

Notably, one of the central nodes 26 resides within the distribution unit 40 and is in communication with the central network switch 24. Accordingly, the central network 22 encompasses the distribution unit 40, allowing for monitoring and control of the operation of the distribution unit 40.

Other central nodes 26 may be directly associated with other systems within the support structure 4 in a similar manner.

The interconnections within each network 22, 48, and between the local networks 48 and the central network 22, may be implemented using suitable cabling to establish direct or 'point-to-point' connections, or may be part of a localised area network (LAN) operated under a suitable protocol (Ethernet for example). Also, it should be appreciated that rather than using cabling, data may be transmitted wirelessly over a suitable wireless network, for example operating under WiFi™ standards (IEEE802.11) with suitable extensions to guarantee determinism and data integrity.

Each local network 48 monitors the operation of its associated RNA 6 and controls the operation of the components of the RNA 6 to achieve local control objectives. For example, one local control module 50 of a local network 48 may monitor rotor speed and control a relevant pitch control system in line with a local pitch control strategy, as derived from a local power-speed curve that is specific for the particular RNA 6 to ensure that maximum power is extracted from wind during below-rated power operating conditions. Meanwhile, another local control module 50 of the same local network 48 acts to control the generator 32 in line with a local torque control strategy to limit power production in above-rated power operating conditions, as also derived from said local power-speed curve.

In summary, each local network 48 operates at the first level of the control network to control the functionality of its respective RNA 6 individually in a way that ignores interaction between the RNA 6 and the rest of the multi-rotor wind turbine system 2, So, each local network 48 is specifically directed to optimising the performance of a respective RNA 6 in line with an associated set of local control objectives, and does not take into account how the operation of the other RNAs 6 or the support structure 2 may influence how the individual RNA 6 should be operated in the context of the wider group.

In parallel, the central network 22 operates at the second level of the control network to provide a coordinated control strategy, and in particular to implement safety-related functionality throughout the wind turbine system 2 in a manner that preserves data integrity.

To achieve this, the central network 22 is configured to exchange data with the local networks 48 to monitor the operation of the wind turbine system 2, and to provide centralised control commands to the local networks 48 to achieve a set of supervisory control objectives to operate the wind turbine system 2 in a unified manner.

Each control command is generated by a node 26 of the central network 22 and then transmitted to a node of the relevant local network 48 via the central network switch 24 and the relevant local network switch 52. The control commands may be of the 'broadcast' type of command in which the same command is sent out to each RNA 6, or the commands may be of the 'directed' type of command in which a specific control command is sent to a selected one or more, but not all, of the RNAs 6.

The objective of the central network 22 is to implement a harmonious control strategy for the group of RNAs 6 so that their interactions between each other, and the interactions between the RNAs 6 and the support structure 4 are managed safely and effectively. The first level and the second level of the control network operate together harmoniously to ensure safety as a first priority. When safety criteria are met, the control network optimises the performance of the wind power system 2 in terms of absolute power production, production efficiency, and fatigue optimisation.

Figure 4:
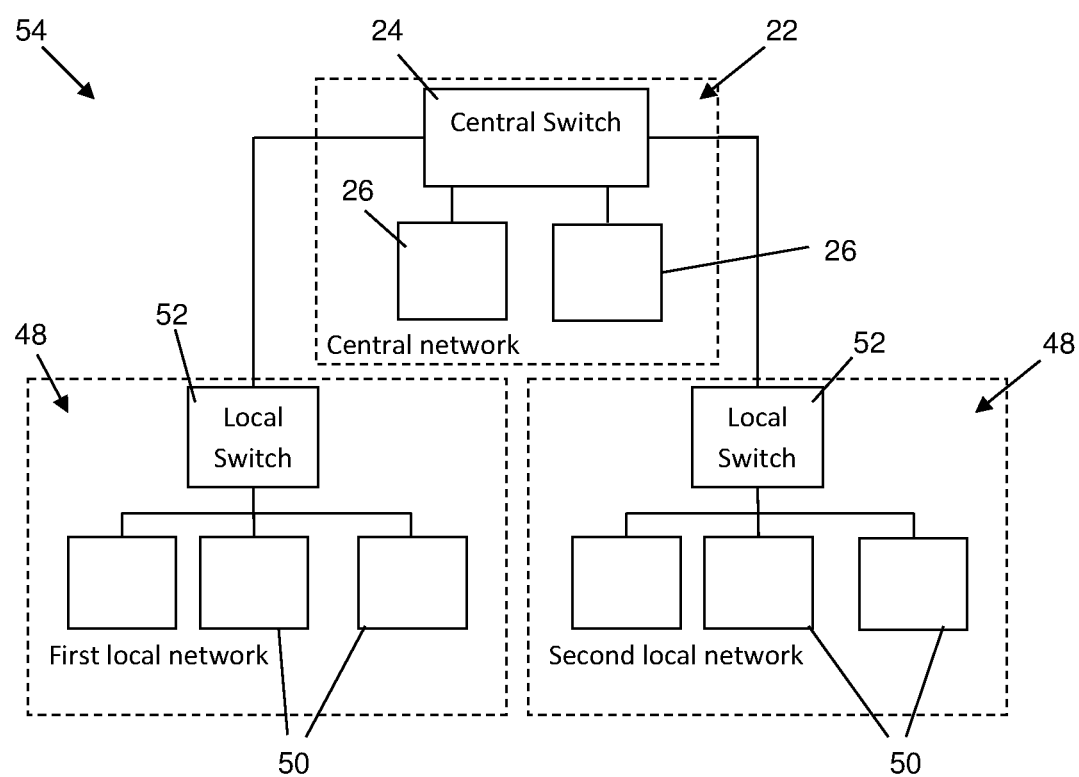
FIG. 4 is a schematic diagram of a control network according to an embodiment of the invention that is configured to control the arrangement of FIG. 1.

Referring now to FIG. 4, an overall control network 54 according to an embodiment of the invention is shown, the control network 54 corresponding to that referred to above in connection with the wind turbine system 2 of FIGS. 1 to 3. Accordingly, the control network 54 incorporates the central network 22 and the local networks 48, which therefore define sub-networks of the control network 54. FIG. 4 concentrates on elements of the control network 54 that relate to critical safety functionality, and so does not show nodes that provide non-critical functions.

The control network 54 is represented in simplified form in FIG. 4, in particular in that it shows only two local networks 48 and therefore omits the local networks 48 of the remaining two RNAs 6 of the wind turbine system 2 of FIGS. 1 to 3.

As noted previously, to provide safety-related functions the control network 54 must act in a deterministic manner, one of the implications of this being that the control network 54 must have access to precise timing information for all events on the network 54. This in turn relies on knowledge of the associated timing for transmission of safety-related data indicating such events.

This is provided for in this embodiment by establishing the central network switch 24 as a master node that sets a network clock against which all communications are synchronised, including internal communications within the central network 22, internal communications within any of the local networks 48, and communications between the networks 22, 48. In this respect, the respective local network switches 52 of the local networks 48 are synchronised to the central network switch 24, thereby providing global synchronisation throughout the control network 54.

Configuring the central network switch 24 as a master node not only for the central network 22, but also for all of the other sub-networks of the control network 54, eliminates the limitations inherent in conventional control networks with respect to adding new local networks. Accordingly, the feature of a master node whose functionality extends to linked local networks provides an elegant solution to the problem of accommodating critical safety-related functions in a control network for a multi-rotor wind turbine system.

As FIG. 4 shows, the central network 22 includes two nodes 26, each of the nodes represented being a central safety controller that is responsible for critical safety-related functions, both locally within the central network 22 and also globally throughout the control network 54. Similarly, each local network 48 is illustrated as having three nodes 50 corresponding to local control modules 50 that act as local safety controllers.

It will be appreciated that each network 22, 48 will have many more nodes than shown in FIG. 4 in practice, including generic nodes that perform other, non-critical functions. These are omitted from FIG. 4 for clarity.

The safety controllers 26, 50 oversee operation of their respective networks 22, 48 to identify hazards as they arise, each safety controller 26, 50 monitoring a respective one or more non-critical nodes or subsystems for certain categories of risk according to the nature of the equipment that the network 22, 48 that they belong to is associated with.

For example, the local safety controllers 50 monitor for risks with respect to operation of the RNA 6 within which the local network 48 resides, such as approaching circuit breaker trips, excess gearbox load or failure of a component of the RNA 6.

Correspondingly, the central safety controllers 26 monitor for risks arising in any part of the wind turbine system 2 excluding the RNAs 6, principally in the support structure 4.

This may include detecting high loads in the support structure 4 for instance, or the presence of personnel. The central safety controllers 26 also monitor the status of each local network 48 as indicated by signals received from the local safety controllers 50, and also detect when connection to a local network 48 is lost, which may indicate a fault or the physical absence of the local network 48, for example if the associated RNA 6 has been removed temporarily for maintenance.

Once a safety controller 26, 50 identifies a risk it takes a predetermined mitigating action, noting that all foreseen risks and the associated corrective actions are catalogued in advance.

Risks arising within the central network 22 are managed by the central safety controllers 26, although if a risk has implications for operation of the RNAs 6, such as high loading in the support structure 4 due to the current pitch angle of the RNAs 6 for example, the necessary control actions are propagated through to the relevant nodes in the local networks 48, In the local networks 48, for some types of risks an associated local safety controller 50 may be able to intervene directly to resolve the problem. In this case, the occurrence of the risk and the implementation of a local solution are reported back to the central network 22, to enable the central safety controllers 26 to maintain complete oversight of the functioning of the control network 54.

In other cases, it may not be possible to identify the appropriate action to address a risk locally in a local network 48, in which case the relevant local safety controller 26 defers to a central safety controller 50 by reporting the risk to the central network 22 to elicit a coordinated response. For example, to mitigate certain risks effectively the status of all of the RNAs 6 must be known, which entails intervention from the central network 22.

Data exchange within the control network 54 occurs by packet switching as is conventional. Accordingly, data to be transmitted from an originating node to a destination node is formatted into a network packet that is transmitted between the respective network switches 24, 52 of the sub-networks 22, 48 according to network transmission schedules.

It is noted that although in this embodiment the RNAs 6 and their associated local networks 48 are identical, in other embodiments each network switch 24, 52 of the control network 54 may have its own unique schedule for routing incoming packets. This could be useful, for example, in a multi-rotor wind turbine system having a heterogeneous RNA setup, in that the RNAs are not all the same. Nonetheless, in such arrangements the respective schedules of the network switches are synchronised to the master node so that communication between networks 22, 48 can be managed carefully and precisely.

An example of a data exchange within the control network 54 shall now be considered, to illustrate how the architecture of the control network 54 facilitates communication whilst preserving the required level of data integrity for safety-related functions. To aid the description of this example, the two local networks 48 shown in FIG. 4 are referred to as a 'first local network' 48 and a 'second local network' 48, although this labelling is entirely arbitrary as the networks are identical in form and function.

In this example, data is sent from a safety controller 26 of the first local network 48 to a safety controller 26 of the second local network 48. To achieve this, a first step is for the safety controller 26 on the first local network 48 to format the relevant data into network packets addressed to the destination node, those packets then being placed on the network, which is suitably time-synchronised and deterministic. The network packet is received by the local network switch 52 of the first local network 48, which then waits for the next available period for transmission, at which point the local network switch 52 of the first local network 48 sends the network packets to the central network switch 24. On receiving the network packets, the central network switch 24 forwards the data to the local network switch 52 of the second local network 48, which contains the destination node. From there, the network packets are delivered to the destination node 50 on a subsequent clock cycle.

Accordingly, communication is routed through the central network 22, and each step of the data transmission occurs within time windows defined by a network clock that is synchronised by the master node, namely the central network switch 24 in this example. This allows the precise time between the data being generated in the originating node in the first local network 48, and then being received at the destination node the second local network 48, to be known and predictable. This in turn allows the transfer time to be taken into account when assessing how quickly action must be taken to mitigate any risks that may be identified by the data.

Although the time-triggered nature of the control network 54 described above finds particular application in safety-related functions, it should be appreciated that scheduling data transmission in this controlled manner is also useful for other functions, particularly functions for which synchronisation is of benefit. Such functions may include coordinating blade pitch changes for each RNA 6 or adapting power production quickly in response to grid events, for example.

It is noted that the architecture of the control network 54 also allows data to be sent to multiple recipients simultaneously, by addressing network packets appropriately. For example, in response to identifying a risk that impacts operation of all of the RNAs 6 equally, a central safety controller 26 may issue a control command configured to effect a safety action to all of the local networks 48 in parallel.

Another advantage of the control network 54 is that it is able to continue functioning effectively when parts of the network 54 are absent or disconnected. This may include the absence of one or more RNAs during initial commissioning before those RNAs have been added, for example, or the loss of connection of the local networks 48 to the central network In the case where contact with a local network 48 is lost because the associated RNA 6 is physically absent or otherwise disconnected, the central network 22 does not alter its transmission to the remaining local networks 48. Safety controllers 26, 50 expecting to receive data from the local safety controllers 26 in the missing local network 48 will be informed that the data is not available, for example via meta-data in network packets. Safety functions on the remaining safety controllers 26, 50 will react to the unavailability of that data according to the individual requirements of those safety functions.

Failure of the central network 22 is more significant as it removes the second level of the control network 54. However, limited functionality continues even in this situation, which may allow the RNAs 6 of the wind turbine system 2 to perform functions relating to servicing and maintenance functions, and safety functions such as controlled idling to minimise loadings on the RNAs 6. Each local network 48 continues to execute safety functions as far as possible, and safety functions that only require local data will be unaffected.

Losing access to the central network 22 entails loss of the synchronisation master, namely the central network switch 24. To address this, each local network switch 52 temporarily becomes the master node for its respective local network 48, allowing local safety functions to continue. When connection to the central network 22 is restored, the situation reverts to its default state such that the central network switch 24 once more becomes the master node for the entire control network 54 and so resumes its role in synchronising the network clock. In turn, the local network switches 52 will synchronise once more with the master node to enable inter-network communication.

The skilled person will appreciate that modifications may be made to the specific embodiments described above without departing from the inventive concept as defined by the claims.

For example, although in the embodiment described above the central network switch acts as a master node, in principle any node on the control network that is configured for safety-related functions may be designated as the master against which all network transmissions are synchronised.

Also, although it is convenient for the central network to be located in the support structure other options are also possible. The central network could be located within one of the RNAs for example, and potentially integrated with the local network of that RNA. Alternatively, the central network could be located separately from the rest of the wind turbine system in a dedicated housing

The invention claimed is:

1. A control network for a wind turbine system, the wind turbine system comprising multiple rotor-nacelle assemblies mounted on a support structure, the control network is configured as a safety network, and comprising:
   a respective local network associated with each rotor-nacelle assembly, each local network comprising multiple nodes, wherein a node of each local network is a safety controller, and each local network comprises a node being operated as a follower clock that is synchronized to a master node; and
   a central network that is connected to each local network, the central network comprising multiple nodes, wherein at least one node of the central network is a safety controller, the central network comprises a synchronization device configured as a master node that sets a network clock for synchronization, and
   wherein the synchronization device synchronizes data transmission throughout the control network according to the network clock.

2. The control network of claim 1, wherein a node of the central network is a network switch.

3. The control network of claim 2, wherein the network switch of the central network at least partially defines the synchronization device.

4. The control network of claim 1, wherein a node of each local network is a network switch.

5. The control network of claim 4, wherein the network switch of the central network is connected to the network switch of each local network.

6. The control network of claim 5, wherein each network switch of each local network is configured to act as a master node for synchronizing data transmission within its associated local network in the event that a connection to the synchronization device is disrupted.

7. The control network of claim 1, configured for packet-switched communication.

8. The control network of claim 1, wherein the synchronization device is configured to schedule data transmissions throughout the control network according to the network clock.

9. The control network of claim 1, configured to route all data transmission through the central network.

10. The control network of claim 1, wherein the central network is associated with the support structure.

11. A method of controlling a wind turbine system, the wind turbine system comprising multiple rotor-nacelle assemblies mounted on a support structure, the method comprising:
   providing a control network of the wind turbine system, the control network being configured as a safety network;
   connecting respective groups of nodes associated with each rotor-nacelle assembly to establish a respective local network for each rotor-nacelle assembly wherein a node of each local network is a safety controller, and each local network comprises a node being operated as a follower clock that is synchronized to a master node;
   connecting each local network to a central network, the central network having multiple nodes, wherein at least one node of the central network is operated as a safety controller, the central network comprises a synchronization device configured as a master node that sets a network clock for synchronization; and
   synchronizing, using the synchronization device, data transfer throughout the control network according to the network clock.

12. A wind turbine, comprising:
   a support structure;
   multiple rotor-nacelle assemblies mounted on the support structure; and
   a control network configured as a safety network, comprising:
      a respective local network associated with each rotor-nacelle assembly, each local network comprising multiple nodes, wherein a node of each local network is a safety controller, and each local network comprises a node being operated as a follower clock that is synchronized to a master node;
      a central network that is connected to each local network, the central network comprising multiple nodes, wherein at least one node of the central network is a safety controller, the central network comprises a synchronization device configured as a master node that sets a network clock for synchronization, and
      wherein the synchronization device synchronizes data transmission throughout the control network according to the network clock.

13. The wind turbine of claim 12, wherein a node of the central network is a network switch.

14. The wind turbine of claim 13, wherein the network switch of the central network at least partially defines the synchronization device.

* * * * *